US008994755B2

(12) United States Patent
Robinson et al.

(10) Patent No.: US 8,994,755 B2
(45) Date of Patent: Mar. 31, 2015

(54) SERVERS, DISPLAY DEVICES, SCROLLING METHODS AND METHODS OF GENERATING HEATMAPS

(75) Inventors: Julien Robinson, Châtenay-Malabry (FR); Myriam Ribière, Montlhery (FR); Mathias Baglioni, Paris (FR); Eric Lecolinet, Paris (FR); Johann Daigremont, Villiers sur Orge (FR)

(73) Assignee: Alcatel Lucent, Boulogne-Billancourt (FR)

(*) Notice: Subject to any disclaimer, the term of this patent is extended or adjusted under 35 U.S.C. 154(b) by 150 days.

(21) Appl. No.: 13/331,748

(22) Filed: Dec. 20, 2011

(65) Prior Publication Data

US 2013/0155118 A1 Jun. 20, 2013

(51) Int. Cl.
*G09G 5/00* (2006.01)
*G06F 17/30* (2006.01)

(52) U.S. Cl.
CPC .............................. *G06F 17/30716* (2013.01)
USPC ....................................................... 345/672

(58) Field of Classification Search
None
See application file for complete search history.

(56) References Cited

U.S. PATENT DOCUMENTS

| | | | | |
|---|---|---|---|---|
| 4,698,624 A * | 10/1987 | Barker et al. | | 345/157 |
| 5,339,391 A * | 8/1994 | Wroblewski et al. | | 345/607 |
| 5,374,942 A * | 12/1994 | Gilligan et al. | | 345/157 |
| 5,495,566 A * | 2/1996 | Kwatinetz | | 715/785 |
| 5,528,260 A * | 6/1996 | Kent | | 345/684 |
| 5,726,687 A * | 3/1998 | Belfiore et al. | | 715/785 |
| 5,867,678 A * | 2/1999 | Amro et al. | | 715/786 |
| 5,874,961 A * | 2/1999 | Bates et al. | | 715/786 |
| 5,903,267 A * | 5/1999 | Fisher | | 715/786 |
| 5,923,861 A * | 7/1999 | Bertram et al. | | 715/786 |
| 6,157,381 A * | 12/2000 | Bates et al. | | 715/786 |
| 6,204,846 B1 * | 3/2001 | Little et al. | | 715/784 |
| 6,337,694 B1 * | 1/2002 | Becker et al. | | 345/684 |
| 6,473,104 B1 * | 10/2002 | Harris | | 715/833 |
| 6,583,795 B1 * | 6/2003 | Ohyama | | 715/785 |
| 6,590,594 B2 * | 7/2003 | Bates et al. | | 715/784 |
| 6,781,571 B2 * | 8/2004 | Bates et al. | | 345/159 |
| 6,972,776 B2 * | 12/2005 | Davis et al. | | 345/684 |
| 7,173,637 B1 * | 2/2007 | Hinckley et al. | | 345/684 |
| 7,193,612 B2 * | 3/2007 | Lindhout et al. | | 345/164 |
| 7,551,188 B2 * | 6/2009 | Ahokas | | 345/684 |
| 7,667,719 B2 * | 2/2010 | Goodwin et al. | | 345/684 |
| 7,698,652 B2 * | 4/2010 | Sagar | | 715/787 |

(Continued)

OTHER PUBLICATIONS

Blanch, R. et al. "Semantic Pointing: Improving Target Acquisition with Control-Display Ratio Adaption", CHI 2004, Apr. 24-29, 2004, Vienna, Austria.

(Continued)

*Primary Examiner* — Devona Faulk
*Assistant Examiner* — Charles L Beard
(74) *Attorney, Agent, or Firm* — Harness, Dickey & Pierce (57) ABSTRACT

Methods of generating heatmaps including receiving, at a first electronic device, first information associated with a first zone of a plurality of zones of a content item, determining at least one first concept related to the first information, receiving at least one target content characteristic, determining at least one second concept related to the at least one target content characteristic, and determining a first heat of the first zone based on the first and second concepts, the first heat representing a measure of similarity between the first and second concepts.

23 Claims, 5 Drawing Sheets

(56) References Cited

U.S. PATENT DOCUMENTS

| | | | |
|---|---|---|---|
| 7,774,713 B2 | 8/2010 | Mital et al. | |
| 7,792,813 B2* | 9/2010 | Selberg | 707/706 |
| 7,873,913 B2* | 1/2011 | Lian et al. | 715/786 |
| 7,900,157 B2* | 3/2011 | Takeshima et al. | 715/786 |
| 7,930,646 B2* | 4/2011 | De Souza Sana et al. | 715/784 |
| 7,937,672 B2* | 5/2011 | Casto | 715/830 |
| 8,214,764 B2* | 7/2012 | Gemmell et al. | 715/833 |
| 8,296,674 B2* | 10/2012 | Haruta | 715/786 |
| 8,341,544 B2* | 12/2012 | Kerr et al. | 715/786 |
| 8,345,068 B1* | 1/2013 | Goodwin et al. | 345/684 |
| 8,418,077 B2* | 4/2013 | Allen et al. | 715/784 |
| 8,438,496 B1* | 5/2013 | Hegde | 715/785 |
| 8,595,643 B2* | 11/2013 | Horagai | 715/786 |
| 8,769,403 B2* | 7/2014 | Tsuda et al. | 715/252 |
| 8,830,274 B2* | 9/2014 | Miyasaka et al. | 345/688 |
| 8,832,590 B1* | 9/2014 | Al-Mohssen | 715/785 |
| 2001/0047290 A1* | 11/2001 | Petras et al. | 705/10 |
| 2002/0027565 A1* | 3/2002 | Syukri | 345/684 |
| 2002/0186251 A1* | 12/2002 | Himmel et al. | 345/784 |
| 2004/0141009 A1* | 7/2004 | Hinckley et al. | 345/786 |
| 2005/0149498 A1* | 7/2005 | Lawrence et al. | 707/3 |
| 2005/0227218 A1* | 10/2005 | Mehta et al. | 434/350 |
| 2005/0257166 A1* | 11/2005 | Tu | 715/787 |
| 2006/0268020 A1* | 11/2006 | Han | 345/684 |
| 2007/0109326 A1* | 5/2007 | Meier et al. | 345/684 |
| 2007/0168413 A1* | 7/2007 | Barletta et al. | 709/203 |
| 2007/0209018 A1* | 9/2007 | Lindemann | 715/784 |
| 2008/0155461 A1* | 6/2008 | Ozaki | 715/784 |
| 2008/0235205 A1* | 9/2008 | Fein et al. | 707/5 |
| 2009/0100373 A1* | 4/2009 | Pixley et al. | 715/786 |
| 2009/0322793 A1* | 12/2009 | Tsuiki | 345/684 |
| 2010/0131455 A1* | 5/2010 | Logan et al. | 707/602 |
| 2010/0188432 A1* | 7/2010 | Tsai et al. | 345/684 |
| 2010/0198834 A1* | 8/2010 | Petras et al. | 707/741 |
| 2010/0277496 A1* | 11/2010 | Kawanishi et al. | 345/589 |
| 2011/0072388 A1* | 3/2011 | Merrell et al. | 715/784 |
| 2011/0289105 A1* | 11/2011 | Hershowitz | 707/769 |
| 2012/0005623 A1* | 1/2012 | Ishak et al. | 715/786 |
| 2012/0038681 A1* | 2/2012 | Summers | 345/684 |
| 2012/0062604 A1* | 3/2012 | Lobo et al. | 345/684 |
| 2012/0075351 A1* | 3/2012 | Imai et al. | 345/684 |
| 2012/0098868 A1* | 4/2012 | Nagasaka | 345/684 |
| 2012/0158755 A1* | 6/2012 | Gammill et al. | 707/754 |
| 2012/0182324 A1* | 7/2012 | Yano | 345/684 |
| 2012/0210203 A1* | 8/2012 | Kandekar et al. | 715/230 |
| 2012/0256967 A1* | 10/2012 | Baldwin et al. | 345/684 |
| 2012/0274665 A1* | 11/2012 | Shimizu et al. | 345/684 |
| 2012/0293559 A1* | 11/2012 | Tomaru et al. | 345/684 |
| 2012/0306934 A1* | 12/2012 | Ohashi et al. | 345/684 |
| 2012/0313977 A1* | 12/2012 | Kwon | 345/684 |
| 2013/0044140 A1* | 2/2013 | Kim et al. | 345/684 |
| 2013/0093795 A1* | 4/2013 | Miyazaki | 345/684 |
| 2013/0135356 A1* | 5/2013 | Shin | 345/684 |
| 2013/0143657 A1* | 6/2013 | Overton | 463/37 |

OTHER PUBLICATIONS

Guiard, Y., et al., "Object pointing: a complement to bitmap pointing in GUIs", In Proceedings of Graphics Interface 2004 (GI '04). Canadian Human-Computer Communications Society, School of Computer Science, University of Waterloo, Waterloo, Ontario, Canada, 9-16.

Baglioni et al. "Flick-and-Brake: Finger Control over Inertial/Sustained Scroll Motion", CHI 2011, May 7-12, 2011, Vancouver, BC, Canada.

International Search Report and Written Opinion issued in International Application No. PCT/IB2012/002820, mailed May 6, 2013.

Ishak, et al., "Content-Aware Scrolling", Columbia University, Department of Computer Science, 2006, pp. 155-158.

* cited by examiner

SERVERS, DISPLAY DEVICES, SCROLLING METHODS AND METHODS OF GENERATING HEATMAPS

BACKGROUND

1. Field

Example embodiments relate to servers, display devices and methods of generating heatmaps, and more particularly to semantic systems determining scrolling characteristics based on content annotation.

2. Description of the Related Art

Mobile reading devices for reading electronic documents, such as e-books, are widespread, and are becoming ever more widespread with the integration of electronic readers (e-readers) into general purpose electronic devices. For example, mobile phones have begun to include integrated reading applications.

Similarly to web surfing, electronic reading (e-reading) is not uniquely a leisurely activity; it is sometimes necessary to search for a particular part of a document, or to scan through a document with a particular reading goal. Examples of documents requiring such reading activities include (but are not limited to) legal documents or study books.

Many solutions exist today for manipulating and browsing through electronic documents. For example, most reading devices provide a common text search in which a user can input a number of characters in a particular order (a character string) and the search function brings the user to portions of a document including the character string. Variations of simple text searches exist, including searches that highlight every instance of a character string in a document.

As another example, electronic devices are often connected to input devices that facilitate document navigation. These electronic devices may include, for example, mouse buttons used to select an object and mouse wheels used to scroll through documents.

Recently, touch sensitive surfaces (e.g., touch screens) have become available. Touch-sensitive surfaces bring new capabilities for interacting with documents as well as some limitations. For example, tabletops and smartphones including touch screens usually have no equivalent of mouse buttons and a mouse wheel. These limitations are overcome through new interaction techniques.

For instance, some solutions focus on associating new interactions to document behavior: tilt, acceleration, thumb pressure and the like are associated to scrolling, opening or closing. For example, pressure may serve as an alternative to multi-tap for text entry with different pressure levels for different letters on a key, and for a virtual keyboard, where pressure allows an uppercase switch. Further, pressure may facilitate one-handed continuous scrolling. When a pressure threshold is exceeded in a part of a touch screen, the contents start to scroll upwards or downwards, with the direction being adjustable via tiny thumb gestures.

Other interaction techniques include swipe, flick or pinch gestures that substitute for conventional user interactions. For example, flick gestures are generally proposed for scrolling through a document being displayed on a touch sensitive surface. Common implementations of flicking involve kinetic scrolling: once a graphical object, for instance a list, has been metaphorically thrown by the user, the system simulates inertia (the object continues to move) as well as friction (the speed progressively decreases down to rest). The deceleration is automatically controlled by the system.

Flick-and-Brake scrolling is a variation of kinetic scrolling that lets the user control this deceleration by pressing a finger on the screen: the stronger the pressure, the stronger the deceleration, analogous to real world physics. Different types of flick-and-brake scrolling have been proposed.

With the advent of electronic documents, other types of user activities not related to document manipulation have also evolved. In the past, when reading a conventional paper document, some readers would annotate passages of the document. An annotation is a note that is made while reading any form of text. For example, highlights, bookmarks, corrections, notes, drawings, underlining, and brief comments are all types of annotations.

Modern analogues to paper annotations include electronic annotations, tags and the like. Electronic annotations are often, but not always, user generated content. For example, social networks of readers may annotate electronic documents and the annotations may be centrally stored on a server. Each member of the social network may access the content generated by other members of the social network. Non-user generated content may include annotations produced by, for example, e-book publishers.

Many methods of manipulating and browsing documents, and making available user generated content, are used in the conventional art. These methods involve user interactions and goals that do not correspond to a particular context (location, activity) or a particular content. For example, while a user can search for a character string, a user cannot search for a literary technique. An example of an unsearchable literary technique is irony. Irony may refer to the use of words to express something other than and sometimes the opposite of the literal meaning, or incongruity between the actual result of a sequence of events and the normal or expected result. Irony is not conventionally searchable because it is context dependent and requires subject matter analysis to detect.

SUMMARY

Example embodiments include methods of determining user interaction parameters based on a user goal, including conventionally unsearchable subject matter.

For example, example embodiments include determining scrolling characteristics of an e-document by associating a user goal with a concept, associating user generated content related to the e-book with a concept by document zone (e.g., paragraph) and generating a heat map that maps the similarity between the user goal concept and the user generated content concept by zone. Document zones in which there is a relatively strong measure of similarity between the user goal concept and the user generated content concept are "hot" while zones for which there is a weak measure of similarity are "cold."

Scrolling characteristics of the e-document being displayed by an e-reader may be different by paragraph based on the heat map. For example, the greater a similarity between a search concept and a user generated content concept for a paragraph (e.g., the 'hotter' the paragraph), the slower a rate of scrolling of that paragraph. Accordingly, a user may scroll through a document looking for a particular context or a particular content in an e-document. The user's attention may be drawn to portions of the e-document relating to the context or content by a change in an interaction parameter of the e-reader displaying the e-document. For example, an e-document scrolling may slow down when 'hot' paragraphs are displayed.

According to an example embodiment, a method of generating a heatmap includes receiving, at a first electronic device, first information associated with a first zone of a plurality of zones of a content item, determining at least one first concept related to the first information, receiving at least one target content characteristic, determining at least one second concept related to the at least one target content characteristic, and determining a first heat of the first zone based on the first and second concepts, the first heat representing a measure of similarity between the first and second concepts.

According to another example embodiment, a scrolling method includes varying, by a content display device, at least one scroll characteristic based on a heatmap of correlation weights between a plurality of first concepts based on a content item and at least one second concept based on a user goal.

According to a further example embodiment, a server includes an interface and a semantic heatmap module configured to receive information associated with a plurality of zones of a content item, generate first concept clouds by associating first concepts to the information, the first concept clouds representing the first concepts, group the first concept clouds by zone, receive at least one target content characteristic, generate at least one second concept cloud by associating at least one second concept to the at least one target content characteristic, the second concept cloud representing the at least one second concept, and assign a zone heat to each of the zones by determining a similarity between the grouped first concept clouds associated to each of the zones and the at least one second concept cloud.

According to still another example embodiment, a display device includes a reading module, a braking module configured to vary at least one scroll characteristic of the display device based on a heatmap of weighted correlations between a plurality of first concepts based on a content item and at least one second concept based on a user goal, and an I/O device.

BRIEF DESCRIPTION OF THE DRAWINGS

The present invention will become more fully understood from the detailed description given herein below and the accompanying drawings, wherein like elements are represented by like reference numerals, which are given by way of illustration only and thus are not limiting of the present invention and wherein.

It should be noted that these Figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of molecules, layers, regions and/or structural elements may be reduced or exaggerated for clarity. The use of similar or identical reference numbers in the various drawings is intended to indicate the presence of a similar or identical element or feature.

DETAILED DESCRIPTION

While example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed below, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing example embodiments of the present invention. This invention may, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments will be described with reference to acts and symbolic representations of operations (e.g., in the form of flowcharts) that may be implemented as program modules or functional processes include routines, programs, objects, components, data structures, etc., that perform particular tasks or implement particular abstract data types and may be implemented using existing hardware at existing network elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The example embodiments not limited by these aspects of any given implementation.

Figure 1:
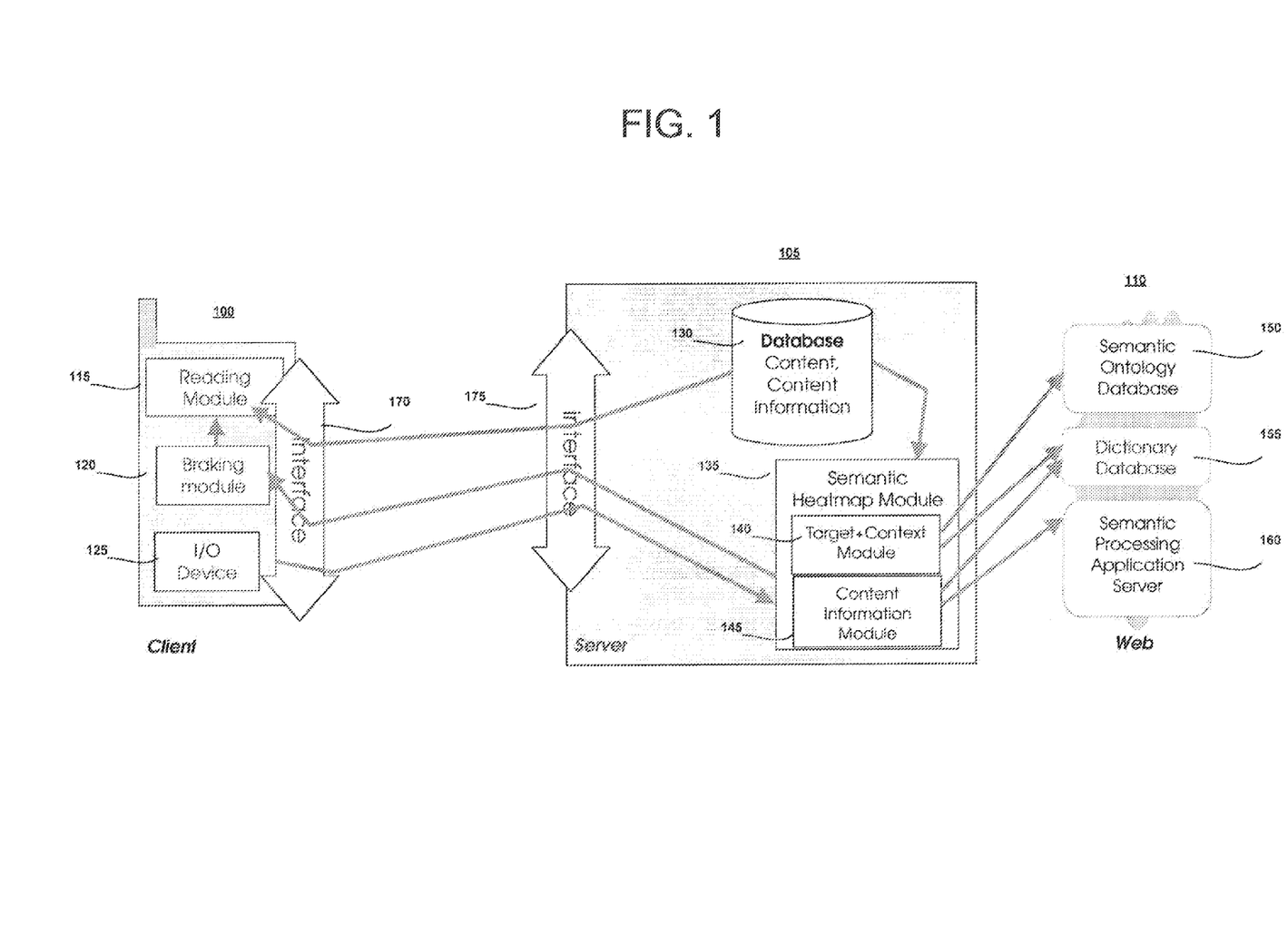
FIG. 1 is a block diagram illustrating a semantic system according to an example embodiment.

FIG. 1 is a block diagram illustrating a semantic system according to an example embodiment. Referring to FIG. 1, a semantic system may include a client 100, a server 105 and a web 110.

The server 105 may be, for example, a back-end PHP server that conforms to representational state transfer (REST) services (e.g., RESTful services), a style of software architecture for distributed hypermedia systems such as the World Wide Web. The server 105 may include a database 130 and a semantic heatmap module 135.

The database 130 may store content and content information. Content may include, for example, e-books, electronic legal documents, videos, document lists, pictures, audio clips and/or any type of electronically distributable data. Content information may be information related to the content and may be generated by a user of the content. User generated content may include, for example, annotations, tags and the like.

The semantic heatmap module 135 may receive a request for content and at least one target characteristic from the client 100 via the interface 175 (e.g., a network interface), and may compute a heatmap for the requested content (described below). A target characteristic may be, for example, a user goal with respect to the requested content. A target characteristic may be a concept or a characteristic that may be associated to a concept.

As one example, a target characteristic may be 'metaphor,' 'irony,' 'analogy' or some other literary technique, the determination of the existence of which requires content analysis. As another example, a target characteristic may be a quality or description, for example, an emotion. The target characteristic may be represented by one or more words, and/or generally by any type of content. For example, the target characteristic may be a picture.

The heatmap module may include, for example, a target+context module 140 and a content information module 145. The target+context module 140 may receive at least one target characteristic from the client 100 and semantically process the target characteristic.

Semantic processing includes associating concepts to information. For example, semantic processing may include using one or more semantic processing algorithms to identify concepts that are most relevant to the meaning of the information, by traversing graphs (e.g., keyword-based searching in graphs), and computing distances and similarities. The concepts may be organized as one or more semantic clouds. A semantic cloud may be a list of concepts relevant to the meaning of a semantically processed item sorted according to relevance such that higher-order concepts take precedence.

Semantic processing algorithms are well known to one of ordinary skill in the art. One example of semantic processing that is well known includes the use of parts-of-speech tagging (POS tagging) and named entity recognition (NER). POS tagging may assign syntactic categories like noun, pronoun, verb and adjective to each component (e.g., word) in text. Name entity recognition may locate and classify parts of text into predefined categories such as the names of persons, organizations, locations, expressions of times, quantities, monetary values, percentages, and/or the like.

POS tagging and named entity recognition may be applied to the target characteristic. Accordingly, the language dependent target characteristic may be POS tagged and language dependent named entities (e.g., a named entity cloud) may be extracted from the tagged components. For each named entity, the target+context module 140 may call to a public web service, for example, a semantic ontology database 150 and/or a dictionary database 155, to obtain information related to each named entity (and hence the target characteristic). For example, the target+context module 140 may perform a search using a semantic ontology database 150 to retrieve a list of language independent concepts (e.g., a concept cloud) for each named entity derived from the target characteristic. For each concept, the target+context module 140 may retrieve a description of the concept (called an abstract) from the semantic ontology database 150. POS tagging and named entity extraction may be performed on the abstracts for each concept. As a result, both the target characteristic and the concepts may be associated to named entity clouds.

The target characteristic and each concept may be represented by vectors (lists) of their associated named entities ponderated with their frequency. The vector of the target characteristic may be compared to the vector of each concept to determine which concepts are closer to the target characteristic. The closeness is represented by a measure of similarity between each of the concepts and the target characteristic, also called a distance from the concept to the text. The distance is generally computed as the cosine measure between vectors. Specifically, the cosine between vectors is determined by using the named entities as directions, and the number of occurrences of each named entity in each cloud as that cloud's coordinate along that direction. Computation of similarities between lists of entities is well known in the art.

The distances may be used to determine the relevancy of each concept to the target characteristic and to generate semantic clouds associated with the target characteristic. Accordingly, natural language may be changed into semantic concepts by a semantic processing algorithm.

As a specific example of semantic processing, the target+context module 140 may receive a target characteristic of "irony." The target+context module 140 may obtain information related to irony from a semantic ontology database 150 and/or a dictionary database 155 of the web 110. The information may be processed using a semantic processing algorithm to identify a set of concepts related to irony. The most relevant concepts may be organized as one or more semantic clouds associated with irony. If more than one meaning may be associated to the information of the target characteristic(s), the target+context module 140 may use the content as context in order to determine the most likely meaning of the target characteristic.

The content information module 145 may receive content information from the database 130 and cause the content information to be semantically processed. For example, the heatmap module may obtain content information from the database 130 and/or information related to the content information from a dictionary database 155. The content information module 140 may send the content information and/or information obtained from the dictionary database 130 to a semantic processing application server 160. A semantic processing application server 160 may be a server that semantically processes information. The content information module 145 may receive semantic cloud(s) associated to the content information from the semantic processing application server 160.

As an example, the content information module 145 may retrieve at least one annotation related to at least one paragraph (e.g., zone) of an e-document from the database 130. The content information module 145 may call to, for example, the semantic processing application server 160 and/or the dictionary database 155. The semantic processing application server 160 may associate the annotations and/or information provided by the dictionary database 155 to at least one concept. For example, the semantic processing application server 160 may generate at least one semantic cloud for each paragraph of an e-document based on the annotations and information from the dictionary database 155. The semantic cloud(s) may be sent to the content information module 145.

The semantic heatmap module 135 may compute one or more measures of similarity between the content information and the target characteristic(s). For example, the semantic heatmap module 135 may compute one or more measures of similarity between the one or more concept clouds of the content information and the one or more concept clouds of the target characteristic in a somewhat similar manner to that described above with respect to semantic processing algorithms. The one or more measures of similarity may be mapped by the heatmap module 135 to the content by zone to generate zone heats. The zone heats may be compiled as a heatmap.

In a case where no target characteristic is input by a user, each heat may be set to a fixed value, for example, a "1," or related to other parameters, for example, the creation date of the content information (e.g., more recent annotations result in "hotter" zones). The server 105 may send the content and the heatmap to the client 100 through the interface 175 (e.g., a network interface).

According to at least one example embodiment, a server may include an interface and a semantic heatmap module configured to receive information associated with a plurality of zones of a content item, generate first concept clouds by associating first concepts to the information, group the first concept clouds by zone, receive at least one target content characteristic, generate at least one second concept cloud by associating at least one second concept to the at least one target content characteristic, and assign a zone heat to each of the zones by determining a similarity between the grouped first concept clouds associated to each of the zones and the at least one second concept cloud.

The client 100 may be an electronic device. For example, the client 100 may be a television, an audio device, a cellular phone, a smartphone, a digital camera, a video camera, a personal navigation device, a computer, a personal digital assistant, an e-reader, a tablet computer and/or the like. The client 100 may use, for example, HTML and Javascript as a font end client. The client 100 may include a reading module 115, a braking module 120, at least one input/output (I/O) device 125 and/or an interface 170.

The reading module 115 may include a display and application software and/or hardware to drive the display. The reading module 115 may display content to the user and control display characteristics of the content. The display characteristics may include, for example, scrolling characteristics. A scrolling characteristic may be, for example, a type of scrolling (e.g., flick and brake), a speed of scrolling, a scrolling rate of change of scrolling (acceleration/deceleration) and/or the like.

The braking module 120 may supply values for at least one display characteristic to the reading module 115. The values may be determined by the braking module 120 from a heatmap of the document being displayed. The reading module 115 may control the display of an electronic document based on the values of the display characteristic supplied by the braking module 120.

The at least one input/output device 125 may be a physical device and/or a simulated device. For example, an input/output device 125 may be a virtual keyboard accessed using a touch screen. The client 100 may receive a request for content from a user via the input/output device 125. According to an example embodiment, upon receiving a request for content, the client 100 may prompt the user to input a target characteristic via an input/output device 125.

The client 100 may communicate with the server 105 through an interface 170. Upon receiving a target characteristic from the user, the client 100 may send the target characteristic and the request for content to the server 105. The client 100 may receive the requested content and a heatmap of the content from the server 105 through the interface 170. The interface 170 may be, for example, a network interface.

Although the example embodiment illustrated in FIG. 1 is described with particularity, one of ordinary skill in the art understands that the functions of various components and modules may be consolidated to a single device, may be segregated between additional devices, may be performed differently and/or the like. For example, the content information module may access the semantic ontology database 150 and generate concept clouds without the use of the semantic processing application server 160. Similarly, the target+context module 140 may utilize the semantic processing application server 160 rather than generating the concept clouds. As another example, the client 100 may perform each function of the server 105 and the server 105 may not be used.

According to at least one example embodiment, a display device includes a reading module, a braking module configured to vary at least one scroll characteristic of the display device based on a heatmap of weighted correlations between a plurality of first concepts based on a content item and at least one second concept based on a target characteristic, and an I/O device.

Figure 2:
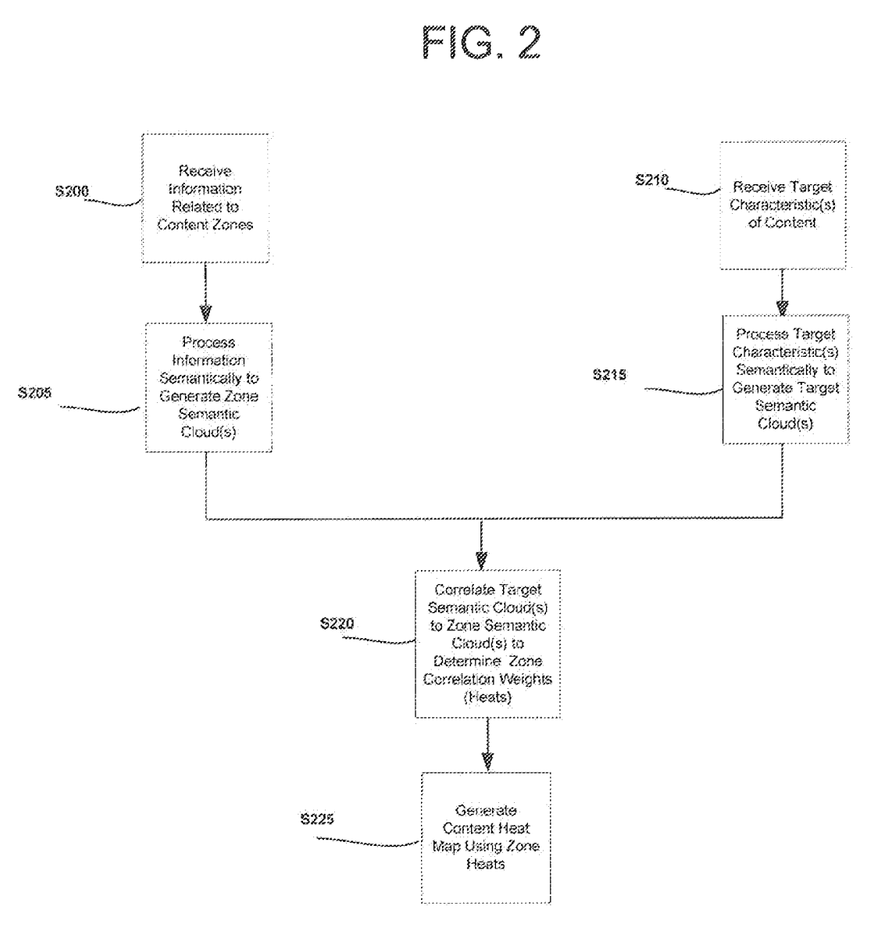
FIG. 2 is a flow diagram illustrating a method of generating a heat map according to an example embodiment.

FIG. 2 is a flow diagram illustrating a method of generating a heat map according to an example embodiment. Referring to FIG. 2, content information related to one or more content zones (S200) and one or more target characteristics of content (S210) may be received. The content information may be semantically processed to generate one or more zone semantic clouds (S205) and the target characteristic(s) may be processed to generate one or more target characteristic semantic clouds (S215). The target semantic clouds may be correlated to the zone semantic clouds to determine zone correlation weights (e.g., heats) (S220). A content heat map may be generated using the zone heats (S225).

As one non-limiting example, a server (e.g., the server 105) may receive a request for an e-book, a target characteristic of "irony" and user generated annotations associated with the e-book. The word "irony" may be processed to generate one or more concept clouds including one or more concepts related to irony. The annotations may be processed to associate one or more concept clouds including one or more concepts related to the annotations. The server 105 may, for each paragraph of the e-book, compare the associated concept clouds generated for "irony" and the concept clouds generated for the annotations to determine at least one correlation weight between the respective concept clouds. The correlation weights of the paragraphs may each be a "heat" of a corresponding paragraph. The server 105 may compile a heatmap using the paragraph heats.

FIGS. 3A-3D are flow diagrams illustrating methods of using heatmaps according to example embodiments. Although four methods are described in FIGS. 3A-3D with respect to different types of electronic media, these methods are provided to demonstrate the broad applicability of example embodiments to various types of electronic media. However, example embodiments are not limited to the specific methods and/or electronic media described herein.

Figure 3A:
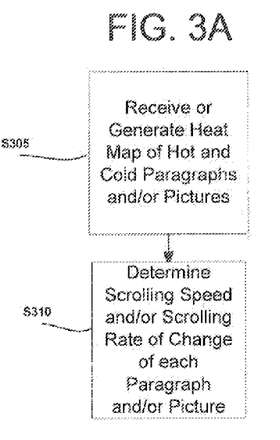
FIGS. 3A-3D are flow diagrams illustrating methods of using heatmaps according to example embodiments.

Referring to FIG. 3A, a heatmap may be received by a client 100 and/or generated by a server 105 (S305). The heatmap may include heats for each paragraph of an e-document and/or for zones of a picture. The heatmap may be used, for example, to determine a scrolling speed and/or a scrolling rate of change (e.g., acceleration/deceleration) of each paragraph and/or picture being displayed on an electronic device (S310). For example, the electronic device may include the client 100.

According to at least one example embodiment, a heatmap may include mappings between heats and zones for both text and graphics of a single e-document. For example, a reading goal of "irony" and annotations related to a zone including both text and a picture describing an ironic situation may be semantically processed. The zone corresponding to the text and picture may be "hot" when the annotations include commentary related to irony. As a user is scrolling through the e-document, upon display of the zone including the picture and text, a speed of the scrolling may be either increased, decreased or maintained based on the heat the heat of the zone and a heat of a zone displayed just prior to the currently displayed zone.

Figure 3B:
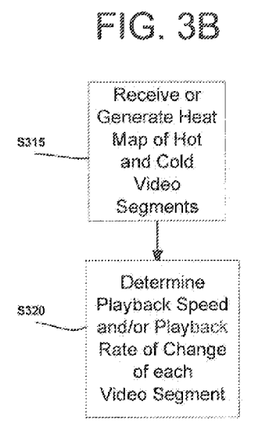

Referring to FIG. 3B, a heatmap may be received by a client 100 and/or generated by a server 105 (S315). The heatmap may include heats for each video segment of a video. The heatmap may be used by a display device including the client 100 to determine a playback speed and/or a playback rate of change of each video segment of the video (S320).

According to at least one example embodiment, a heatmap may be a heatmap of a video. A viewing goal and electronic tags related to video segments may be semantically processed. For example, a video segment may be "hot" when a viewing goal is "irony" and tags related to a video segment are associated to concepts related to irony. A display device in a fast-forwarding mode may fast-forward through the video. Upon reaching a video segment, the fast-forwarding speed may increase, decrease or be maintained, based on the heat of the video segment and a heat of a video segment displayed just prior to the current video segment. For example, if the video segment corresponds to the hottest zone of the video, the fast-forwarding speed may be reduced and/or the video playback may be changed to a normal viewing playback speed when the hottest video segment is displayed.

Figure 3C:
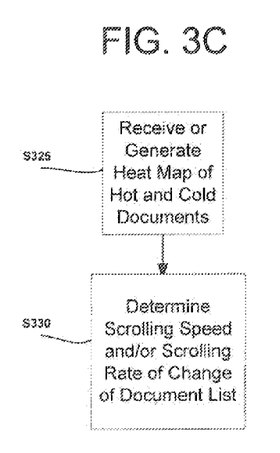

Referring to FIG. 3C, a heatmap may be received by a client 100 and/or generated by a server 105 (S325). The heatmap may include heats for each document in a document list. The heatmap may be used by a client 100 to determine a scrolling speed and/or a scrolling rate of change of the document list (S330).

According to at least one example embodiment, the heatmap may include heats for a list of documents saved in a database (e.g., an index). For example, a target characteristic of "irony" and notes made using a note function in each of the documents may be semantically processed. A document may be "hot" when the notes corresponding to the document are associated to concepts related to irony. As a user is scrolling through the list of documents, upon display of the name of the hot document, for example in one horizontal subdivision of the display, a speed of the scrolling may be increased, decreased or maintained based on the heat of the hot document and a heat of the document displayed just prior to the current document. For example, if the currently displayed document name corresponds to the hottest document in the document list, the scrolling speed may be reduced and/or the scrolling may be briefly paused.

Figure 3D:
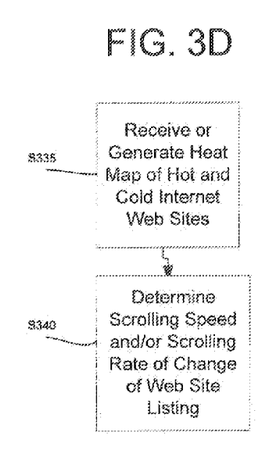

Referring to FIG. 3D, a heatmap may be received by a client 100 and/or generated by a server 105 (S335). The heatmap may include heats for each website listing in a website list. The heatmap may be used by a client 100 to determine a scrolling speed and/or a scrolling rate of change of the website list (S340).

According to at least one example embodiment, a heatmap may include heats for internet websites listed on a golf related webpage. Reviews of the websites available on the web 110 and a target characteristic of "golf metaphors" may be semantically processed. An internet website may be "hot" when the reviews are associated to concepts related to golf metaphors. As a user is scrolling through the website list, upon display of a website listing, for example in one horizontal subdivision of the display, a speed of the scrolling may be increased, decreased or maintained based on the heat of the website listing and a heat of the website listing displayed just prior to the current website listing. For example, if the currently displayed internet website listing corresponds to the hottest website listing in the website list, the scrolling speed may be reduced and/or the scrolling may be briefly paused.

Although example embodiments described with respect to FIGS. 3A-3D include increasing, decreasing or maintaining a scrolling speed, one of ordinary skill will understand that many variations are within the scope of the inventive concepts. For example, heats may be assigned one of two values so that scrolling is in effect a jumping between "hot" content. As another example, a scroll characteristic may be a braking factor. Other display characteristics, such as magnification, brightness, contrast, rotation, and the like are also contemplated by example embodiments. Further, various combinations of display characteristic determinations are contemplated by example embodiments.

Figure 4:
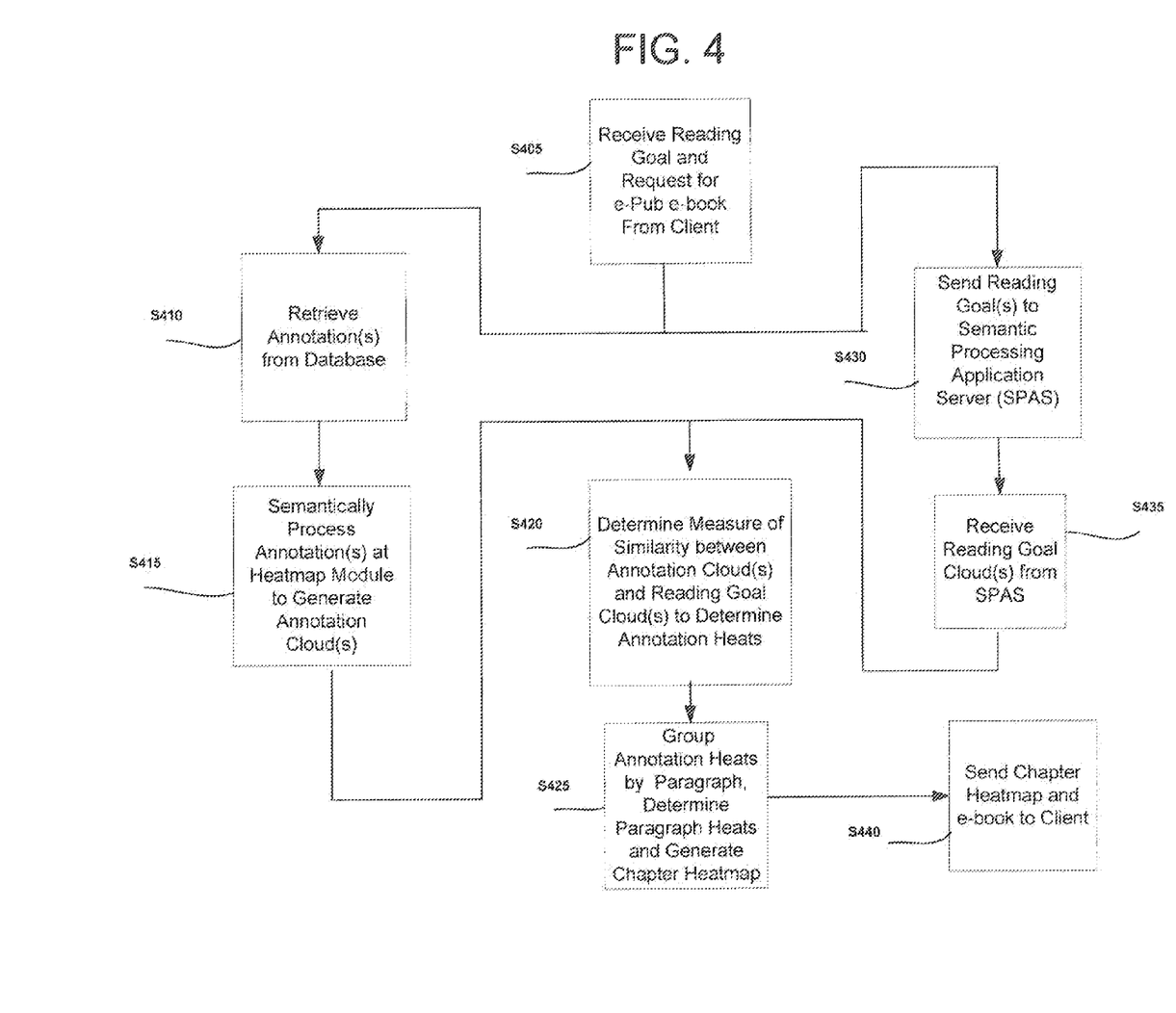
FIG. 4 is a flow diagram illustrating a method of generating an e-book heat map according to an example embodiment.

FIG. 4 is a flow diagram illustrating a method of generating an e-book heat map according to an example embodiment. Referring to FIG. 4, a server 105 may receive a reading goal and a request for an electronic publication (e-Pub) e-book from a client 100 (S405). One or more annotations corresponding to the e-book may be retrieved from the database 130 (S410). The annotations may be semantically processed by the semantic heatmap module 135 to generate one or more annotation clouds (S415).

The server 105 may send the reading goal to a semantic processing application server 160 (S430). In response, one or more reading goal clouds may be received by the server 105 from the semantic processing application server 160 (S435). The server 105 may determine a measure of similarity between the reading goal cloud(s) and the annotation cloud(s) to determine annotation heats (S420).

The annotation heats may be grouped by paragraph. The server 105 may determine paragraph heats from the grouped annotation heats. For example, a paragraph heat may be the sum of the heats of the annotations associated to the paragraph. A chapter heatmap may be generated for a chapter of the e-book by compiling the paragraph heats of the chapter (e.g., generating a mapping between paragraph heats and paragraphs of the chapter) (S425). The chapter heatmap and the corresponding chapter of the e-book may be sent to the client 100 (S440). According to at least one example embodiment, a heatmap may be generated for each of the chapters of the e-book and the server 105 may send an e-book heatmap and the entire e-book to the client 100.

Although the example embodiment illustrated in FIG. 4 is described with particularity, one of ordinary skill in the art understands that the described method is an example and may be modified in various ways. For example, the annotations may be sent to the semantic processing application server 160 in S430 and the reading goal may be semantically processed in the heatmap module 135 in S415. According to example embodiments, both of the annotations and the reading goal may be processed by only the heatmap module 135 or by only the semantic processing application server. According to at least one example embodiment, all processing may be performed by the client 100.

Figure 5:
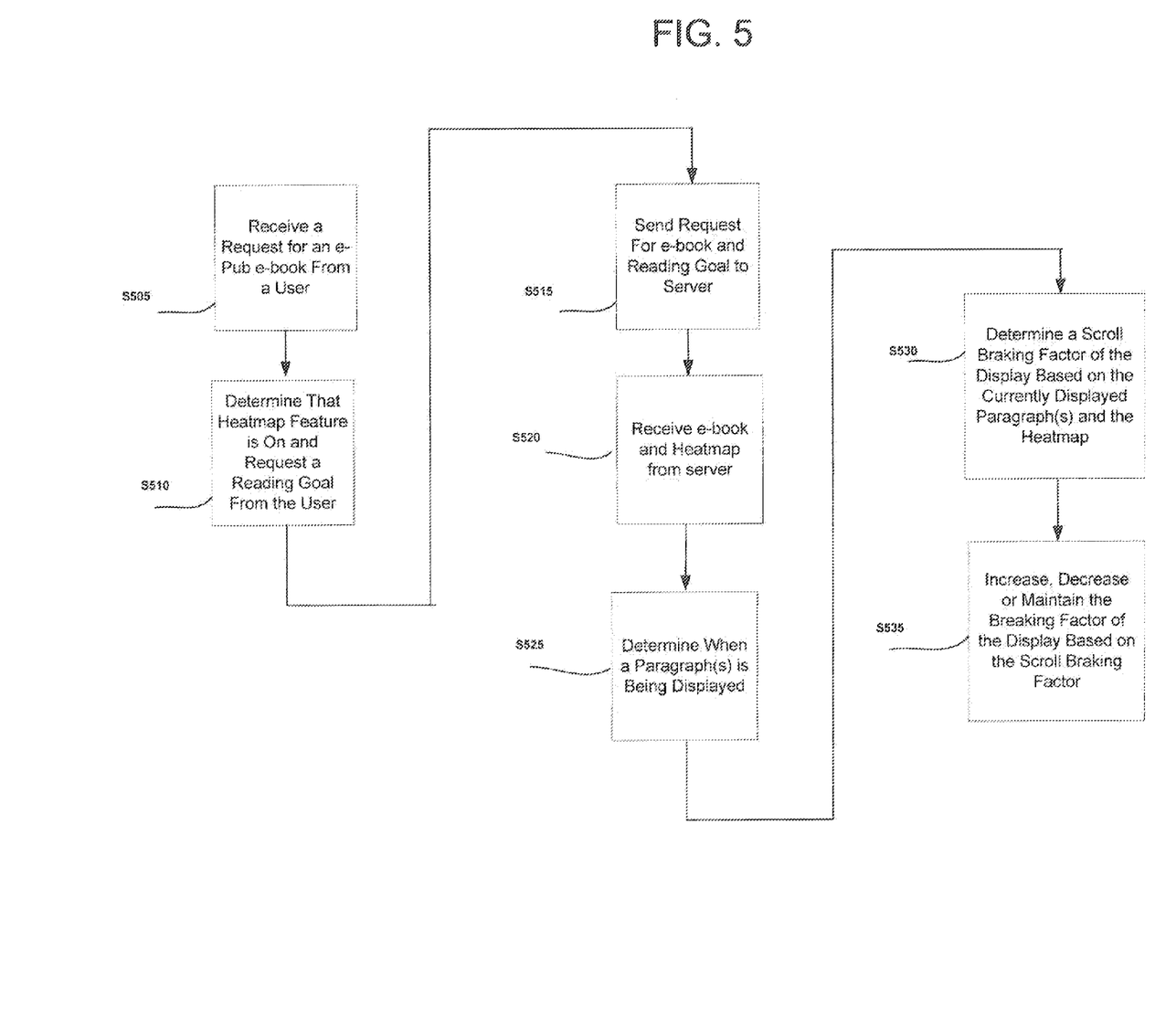
FIG. 5 is a flow diagram illustrating a scroll method according to an example embodiment.

FIG. 5 is a flow diagram illustrating a scrolling method according to an example embodiment. Referring to FIG. 5, a client 100 may receive a request for an e-Pub e-book from a user (S505). The client 100 determines that a heatmap feature is "on." The client 100 may prompt the user for a reading goal (S510). Upon receiving a reading goal from the user, the reading goal and a request for the e-book may be sent to the server 105 (S515). In response, the requested e-book and a heatmap of the e-book may be received by the client 100 from the server 105 (S520).

The client 100 may display the e-book to the user, for example, by chapter. The client 100 may determine when a paragraph of the chapter is being displayed (S525). A scroll braking factor of the display may be determined based on the currently displayed paragraph and the heatmap (S530). According to at least one example embodiment, the scroll braking factor may be determined prior to display of the paragraph. Based on the current value, the scroll braking factor of the display may be increased, decreased or maintained (S535).

If a paragraph is being displayed for the first time, the braking factor may be changed or maintained relative to a default value. If the current paragraph follows a previous paragraph, the braking factor may be changed or maintained based on a relative heat of the current paragraph with respect to the previous paragraph. For example, the greater a heat of the paragraph the greater the braking factor may be. An example braking formula may be: a+b*(sum (heat, for each currently displayed paragraph)), where a and b are parameters to be set by user experimentation and relative to the possible values of heat.

For example, a user may launch scrolling on a display in a flick and brake mode of the client 100 with a flick of a thumb. The scrolling may be braked so that the scrolling gradually stops. The braking may be greater when a "hot" paragraph is displayed and slower when a "cold" paragraph is displayed. According to at least one example embodiment, a thumb gesture is less efficient for hot zones so that acceleration is slower.

Although example embodiments illustrated in FIGS. 4 and 5 are described with particularity, one of ordinary skill in the art understands that the described methods are an example and may be modified in various ways. For example, according to at least one example embodiment, all processing may occur at the client 100.

According to at least one example embodiment, a scrolling method includes receiving, at a first electronic device, first information associated with a first zone of a plurality of zones of a content item, determining at least one first concept related to the first information, receiving at least one target content characteristic, determining at least one second concept related to the at least one target content characteristic, determining a first heat of the first zone based on the first and second concepts, the first heat representing a measure of similarity between the first and second concepts and determining at least one scroll characteristic of a display device based on the first heat.

While example embodiments have been particularly shown and described, it will be understood by one of ordinary skill in the art that variations in form and detail may be made therein without departing from the spirit and scope of the claims.

We claim:

1. A method of generating a heatmap, comprising:
   receiving, at a first electronic device, first information associated with a first zone of a plurality of zones of a content item;
   determining at least one first concept related to the first information;
   receiving at least one target content characteristic from a user;
   identifying, from among a plurality of second concepts, at least one of the plurality of second concepts related to the at least one target content characteristic based on a vector distance between the at least one second concept and the at least one target content characteristic; and
   determining a first heat of the first zone based on the first concept and the at least one second concept, the first heat representing a measure of similarity of the first concept and the at least one second concept.

2. The method of claim 1, further comprising:
   receiving second information associated with a second zone of the plurality of zones of the content item;
   determining at least one third concept related to the second information;
   determining a second heat of the second zone based on the second and third concepts; and
   determining at least one scroll characteristic of a display device based on the first heat.

3. The method of claim 2, further comprising:
   generating at least one first semantic cloud representing the at least one first concept;
   generating at least one second semantic cloud representing the at least one second concept; and
   generating at least one third semantic cloud representing the at least one third concept,
   wherein the determining a first heat includes determining the first heat based on the first and second semantic clouds, and
   the determining a second heat includes determining the second heat based on the second and third semantic clouds.

4. The method of claim 2, wherein
   the first and second zones are adjacent, and
   the determining at least one scroll characteristic includes determining the scroll characteristic as a function of both the first and second heats.

5. The method of claim 2, further comprising:
   sending, by the first electronic device, a mapping between the first heat, the second heat, the first zone and the second zone to the display device,
   wherein the display device is not part of the first electronic device.

6. The method of claim 2, further comprising:
   determining the at least one scroll characteristic based on the second heat.

7. The method of claim 6, further comprising:
   displaying at least a portion of the first zone to a user,
   wherein the determining the at least one scroll characteristic includes one of increasing, decreasing and maintaining at least one of a scrolling speed and a braking factor of the display device based on the first heat one of prior to and during the displaying the at least a portion of the first zone to the user.

8. The method of claim 7, further comprising:
   displaying at least a portion of the second zone to the user simultaneously with the displaying at least a portion of the first zone;
   wherein the determining the at least one scroll characteristic includes determining the at least one of the scrolling speed and the braking factor based on the first and second heats one of prior to and during the displaying at least a portion of the second zone.

9. The method of claim 7, wherein
   the at least one of the scrolling speed and the braking factor includes both the scrolling speed and the braking factor,
   a magnitude of the scrolling speed is inversely proportional to a magnitude of the first heat, and
   a magnitude of braking is proportional to the magnitude of the first heat.

10. The method of claim 1, wherein
    the at least one first concept cannot be located using a textual search of the content item, and
    the determining at least one second concept includes using the content item for context.

11. The method of claim 2, wherein the first and second information include shared user-generated content (UGC) based on the content item.

12. The method of claim 11, wherein the content item is one of an e-book, a document list, a video and a listing of websites.

13. The method of claim 12, wherein
    the content item is an e-book,
    the first and second information each include at least one annotation, and
    the first and second zones are chapters of the e-book.

14. The method of claim 3, wherein
    the receiving first information includes receiving a plurality of discrete first information,
    the generating a first semantic cloud includes generating a plurality of first semantic clouds, and
    the determining a first heat of the first zone includes determining the first heat based on the plurality of first semantic concept clouds and the second semantic cloud.

15. A scrolling method, comprising:
    identifying, from among a plurality of second concepts, at least one of the plurality of second concepts related to at least one target content characteristic based on a vector distance between the at least one of the plurality of second concepts and the at least one target content characteristic, the at least one target content characteristic being received from a user; and
    varying, by a content display device, at least one scroll characteristic based on a heatmap of correlation weights between a plurality of first concepts based on a content item and the at least one of the plurality of second concepts, the heatmap representing measures of similarity of the at least one of the plurality of second concepts and the plurality of first concepts.

16. The scrolling method of claim 15, wherein
    the plurality of first concepts are based on information about the content item, and
    the information includes at least one annotation.

17. The scrolling method of claim 16, wherein
    the at least one scroll characteristic is a braking factor,
    the display device is a flick and brake display device, and
    the greater a similarity between the first and second concepts the greater a braking.

18. The scrolling method of claim 15, wherein
    the content item is divided into a plurality of content zones,
    each of the correlations weights is associated with one of the content zones, and the varying at least one scroll characteristic includes one of increasing, decreasing and maintaining the scroll characteristic according to a displayed one of the content zones.

19. The scrolling method of claim 18, wherein
a plurality of correlation weights are associated with each of two or more of the plurality of content zones, and
the heatmap is a zone heat map including sums of each of the pluralities of correlation weights.

20. The method of claim 18, wherein
the at least one scrolling characteristic is a flick efficiency,
the display device is a flick and brake display device, and
the flick efficiency decreases as a function of increasing correlation weight.

21. The method of claim 15, further comprising:
prompting the user to input a user goal corresponding to the target content characteristic.

22. A server, comprising:
an interface; and
a semantic processor including a semantic heatmap module configured to
   receive information associated with a plurality of zones of a content item,
   generate first concept clouds by associating first concepts to the information, the first concept clouds representing the first concepts,
   group the first concept clouds by zone,
   receive at least one target content characteristic from a user,
   generate at least one second concept cloud by associating one or more second concepts with the at least one target content characteristic based on vector distances between the at least one target content characteristic and the one or more second concepts, the at least one second concept cloud representing the one or more second concepts, and
   assign a zone heat to each of the zones by determining a similarity of the at least one second concept cloud and the grouped first concept clouds associated with each of the zones.

23. A display device, comprising:
a processing unit including,
   a reading module, and
   a braking module configured to vary at least one scroll characteristic of the display device based on a heatmap of weighted correlations between a plurality of first concepts based on a content item and one or more second concepts based on a target content characteristic from a user, the one or more second concepts being identified from among a plurality of second concepts based on vector distances between the one or more second concepts and the target content characteristic, the heatmap representing measures of similarity of the one or more second concepts and the plurality of first concepts; and
an I/O device.

* * * * *